US011898535B2

(12) United States Patent
Herrig (10) Patent No.: US 11,898,535 B2
(45) Date of Patent: Feb. 13, 2024

(54) WIND TURBINE BLADE MEASUREMENT SYSTEM AND A METHOD OF IMPROVING ACCURACY OF A WIND TURBINE BLADE MEASUREMENT SYSTEM

(71) Applicant: LM Wind Power A/S, Kolding (DK)

(72) Inventor: Andreas Herrig, Salzbergen (DE)

(73) Assignee: LM WIND POWER A/S, Kolding (DK)

( * ) Notice: Subject to any disclaimer, the term of this patent is extended or adjusted under 35 U.S.C. 154(b) by 0 days.

(21) Appl. No.: 17/910,986

(22) PCT Filed: Jun. 18, 2021

(86) PCT No.: PCT/EP2021/066660
§ 371 (c)(1),
(2) Date: Sep. 12, 2022

(87) PCT Pub. No.: WO2021/255261
PCT Pub. Date: Dec. 23, 2021

(65) Prior Publication Data
US 2023/0142485 A1    May 11, 2023

(30) Foreign Application Priority Data
Jun. 18, 2020   (GB) ...................................... 2009315

(51) Int. Cl.
*F03D 17/00*    (2016.01)

(52) U.S. Cl.
CPC .......... *F03D 17/00* (2016.05); *F05B 2260/80* (2013.01); *F05B 2270/8041* (2013.01)

(58) Field of Classification Search
CPC ...... F03D 17/00; F03D 17/001; F03D 17/003; F03D 17/028; F05B 2270/8041
See application file for complete search history.

(56) References Cited

U.S. PATENT DOCUMENTS

| 4,652,917 A | 3/1987 | Miller |
| 7,246,991 B2 | 7/2007 | Bosche |

(Continued)

FOREIGN PATENT DOCUMENTS

| CA | 3027689 A1 | 1/2018 |
| CA | 2990780 A1 | 7/2018 |

(Continued)

OTHER PUBLICATIONS

Translation of DE102010055500 (Year: 2012).*

*Primary Examiner* — Brian O Peters
(74) *Attorney, Agent, or Firm* — Nath, Goldberg & Meyer; Jerald L. Meyer; Tanya E. Harkins (57) ABSTRACT

A wind turbine blade measurement system for optically determining a torsion of a wind turbine blade is disclosed. The wind turbine blade measurement system comprises: a wind turbine blade, which is configured to be mounted to a hub of a wind turbine, a first camera, and an auxiliary camera. The first camera is mounted in a fixed position on a support structure on an exterior surface of the root section of the wind turbine blade and arranged so as to measure along the spanwise direction of the wind turbine blade. The auxiliary camera is arranged at a position outside of the wind turbine blade, the auxiliary camera being arranged so as to being able to carry out measurements of a plurality of sets of markers arranged on the surface of the wind turbine blade and an orientation of at least one of the support structure and the first camera.

15 Claims, 7 Drawing Sheets

(56) References Cited

U.S. PATENT DOCUMENTS

| | | | |
|---|---|---|---|
| 7,400,054 B2 | 7/2008 | Wesselink | |
| 9,261,355 B2 * | 2/2016 | Bertolotti | G01B 11/24 |
| 9,453,500 B2 | 9/2016 | Newman | |
| 9,708,927 B2 | 7/2017 | Hatcher, Jr. et al. | |
| 9,816,807 B2 | 11/2017 | Enevoldsen et al. | |
| 9,996,747 B2 | 6/2018 | Newman | |
| 10,378,517 B2 * | 8/2019 | Bunge | G06T 7/0004 |
| 2006/0078193 A1 | 4/2006 | Brummel et al. | |
| 2009/0266160 A1 * | 10/2009 | Jeffrey | F03D 17/00 |
| | | | 73/455 |
| 2011/0135466 A1 | 6/2011 | Latorre et al. | |
| 2011/0144815 A1 | 6/2011 | Neumann | |
| 2011/0206511 A1 | 8/2011 | Frydendal | |
| 2013/0017086 A1 | 1/2013 | Till | |
| 2014/0054476 A1 | 2/2014 | Zheng et al. | |
| 2018/0003159 A1 | 1/2018 | Bunge | |
| 2019/0050679 A1 | 2/2019 | Newman | |

FOREIGN PATENT DOCUMENTS

| | | | | |
|---|---|---|---|---|
| DE | 202007001136 U1 | 4/2007 | | |
| DE | 102010023250 A1 | 12/2011 | | |
| DE | 102010055500 A1 * | 6/2012 | | F03D 17/00 |
| DE | 102010055500 A1 | 6/2012 | | |
| DE | 102010056033 A1 | 6/2012 | | |
| EP | 1742015 A2 | 10/2007 | | |
| EP | 2345943 A1 | 7/2011 | | |
| EP | 2453136 A1 | 5/2012 | | |
| EP | 2458206 A1 | 5/2012 | | |
| EP | 2458322 A1 | 5/2012 | | |
| EP | 2458323 A1 | 5/2012 | | |
| EP | 2511522 A1 | 10/2012 | | |
| EP | 2530302 A1 | 12/2012 | | |
| GB | 2465790 A | 11/2008 | | |
| WO | 2009143848 A2 | 12/2009 | | |
| WO | 2009143850 A2 | 12/2009 | | |
| WO | 2010054661 A2 | 5/2010 | | |
| WO | 2010089139 A1 | 8/2010 | | |
| WO | 2013084276 A1 | 6/2013 | | |
| WO | 2016037858 A1 | 3/2016 | | |
| WO | 2017158479 A1 | 9/2017 | | |
| WO | 2019038710 A1 | 2/2019 | | |
| WO | 2019110624 A1 | 6/2019 | | |
| WO | 2019200526 A1 | 10/2019 | | |

* cited by examiner

WIND TURBINE BLADE MEASUREMENT SYSTEM AND A METHOD OF IMPROVING ACCURACY OF A WIND TURBINE BLADE MEASUREMENT SYSTEM

This is a National Phase Application filed under 35 U.S.C. 371 as a national stage of PCT/EP2021/066660, filed Jun. 18, 2021, an application claiming the benefit of Great Britain Application No. 2009315.9, filed Jun. 18, 2020, the content of each of which is hereby incorporated by reference in its entirety.

FIELD OF THE INVENTION

The present invention relates to a wind turbine blade measurement system for optically determining a torsion of a wind turbine blade, and a method for improving the accuracy of such a system.

BACKGROUND OF THE INVENTION

Wind turbine blades have become increasingly longer over the years. Due to the length and flexibility of the blades, the potential loads affected on wind turbines with such blades have increased, and it has become increasingly important to control wind turbines and their wind turbine blades to optimize power and noise performance and reduce loads and oscillations during operation of the wind turbine. Many systems have been proposed for measuring at least the deflection of blades during operation in order to control the blade to avoid tower strikes due to deflection of the blades or to control the affected loads. However, it has also become increasingly important to monitor the torsion of the blade during operation to reduce loads and oscillations so that the lifetime of the blades and other parts of the wind turbine can be extended and also to improve performance characteristics. Many of the systems for estimating torsion of the blades are based on internal measurements and have limitations in the spanwise coverage of the tip region or are difficult to calibrate. Accordingly, there is a need for systems and methods that can more accurately measure the torsion of wind turbine blades during operation and which can more easily and accurately be calibrated.

SUMMARY OF THE INVENTION

It is an object of the invention to obtain a new wind turbine blade measurement system and method for improving the accuracy of such a system, which overcome or ameliorate at least one of the disadvantages of the prior art or which provide a useful alternative.

According to a first aspect, this is obtained by a wind turbine blade measurement system for optically determining a torsion of a wind turbine blade, wherein the wind turbine blade measurement system comprises: a wind turbine blade, which is configured to be mounted to a hub of a wind turbine, the wind turbine blade comprising: a root section, which when mounted to the hub, is located nearest the hub, and a plurality of sets of markers provided on an exterior surface of the wind turbine blade at different spanwise positions on the wind turbine blade along a spanwise direction of the wind turbine blade, each set of markers comprising a plurality of individual marker points, a first camera, which is mounted in a fixed position on a support structure on an exterior surface of the root section of the wind turbine blade, and arranged so as to measure along the spanwise direction of the wind turbine blade, and an auxiliary camera, which is arranged at a position outside of the wind turbine blade, the auxiliary camera being arranged so as to being able to carry out measurements of the plurality of sets of markers and an orientation of at least one of the support structures and the first camera.

Equivalently, according to a second aspect, this is obtained by a wind turbine blade measurement system for optically determining a torsion of a wind turbine blade installed on a wind turbine, wherein the wind turbine blade measurement system comprises: a wind turbine with a number of wind turbine blades, including at least a first wind turbine blade, extending from a hub on a main shaft having a substantially horizontal axis, the number of wind turbine blades together with the hub constituting a rotor, which can be put into rotation by wind, wherein the first wind turbine blade comprises: a root section located nearest the hub, and a plurality of sets of markers provided on an exterior surface of the first wind turbine blade at different spanwise positions on the first wind turbine blade along a spanwise direction of the wind turbine blade, each set of markers comprising a plurality of individual marker points,
    a first camera, which is mounted in a fixed position on a support structure on an exterior surface of the root section of the wind turbine blade, and arranged so as to measure along the spanwise direction of the first wind turbine blade, and
    an auxiliary camera, which is arranged at a position relative to the wind turbine, the auxiliary camera being arranged so as to being able to carry out measurements of the plurality of sets of markers and an orientation of at least one of the support structure and the first camera.

According to a third aspect, this is obtained by a method of improving accuracy of a wind turbine blade measurement system, wherein the wind turbine blade measurement system comprises: a wind turbine blade, which is configured to be mounted to a hub of a wind turbine, the wind turbine blade comprising: a root section, which when mounted to the hub, is located nearest the hub, and a plurality of sets of markers provided on an exterior surface of the wind turbine blade at different spanwise positions on the wind turbine blade along a spanwise direction of the wind turbine blade, each set of markers comprising a plurality of individual marker points, a first camera, which is mounted in a fixed position on a support structure on an exterior surface of the root section of the wind turbine blade, and arranged so as to measure along the spanwise direction of the wind turbine blade, and an auxiliary camera, which is arranged at a position outside of the wind turbine blade, the auxiliary camera being arranged so as to being able to carry out measurements of the plurality of sets of markers and an orientation of at least one of the support structures and the first camera, wherein the method comprises the steps of: a) arranging the wind turbine blade in a substantially zero-load condition, b) carrying out a reference measurement of the plurality of sets of markers and calculate zero-load twist angles for each of the spanwise positions on the wind turbine blade using the auxiliary camera, and c) carrying out a first measurement of at least a number of the plurality of sets of markers using the first camera and comparing the first measurement with the reference measurement to calibrate the wind turbine blade measurement system.

The auxiliary camera may be arranged or mounted in a fixed position outside the wind turbine blade. Advantageously, the position relative to the wind turbine blade should be known or derivable in order for the auxiliary camera to obtain the required information from the measurements or acquired images. However, it is also possible to get images from a moving auxiliary camera, e.g. installed on a drone. It is also possible to use multiple images from slightly different angles or using multiple auxiliary cameras. The importance is to be able to have auxiliary images to derive the angle differences between the plurality of sets of markers.

The system in general uses a first camera, which is mounted on the blade and during operation rotates with the wind turbine blade on the blade rotor. The first camera is oriented in the spanwise direction so as to be able to detect the plurality of sets of markers. The system may have a computing unit or processor unit that at least can calculate the induced or relative twist of the blade at the spanwise positions of the blade by detecting the position of the markers, i.e. by taking pictures along the spanwise direction of the blade. Thus, the first camera may be utilised to calculate the relative torsion of the wind turbine blade during operation of the blade. However, due to curvature of the wind turbine blade, the first camera may not necessarily be able to detect all of the sets of markers during standstill or lower loading of the wind turbine blade, e.g. a very low or very high wind speeds. Thus, the first camera may not be accurate enough to calibrate the system during standstill of the wind turbine blade or during a pre-calibration routine, e.g. at the site of manufacturing the wind turbine blade. The system solves this problem by utilising an auxiliary camera, which is arranged at a position, e.g. a stationary position, outside the wind turbine blade, e.g. in a fixed position relative to the wind turbine, such as on the ground near the wind turbine. The auxiliary camera is arranged so as to be able to carry out measurements of the plurality of sets of markers and an orientation of at least one of the support structures and the first camera. Thus, the auxiliary camera may at least during standstill of the wind turbine carry out measurements of the plurality of sets of markers and use this to calibrate the system by comparing the measurements carried out by the auxiliary camera to equivalent measurements from the first camera. Thus, the system and methods according to the first, second and third aspects provide an improved system for optically determining a torsion of a wind turbine blade by accurately being able to calibrate the system, when the wind turbine blade is arranged in a known position.

In general, the specification refers to measurements. However, it is clear that the measurements in general refer to pictures taken or acquired with the first camera or auxiliary camera, and that the pictures are image processed to for instance calculate the angles between markers detected in the pictures.

In the following, a number of advantageous embodiments are described, which are applicable to any of the first, second and third aspects. Further, the described embodiments can be combined in any combination.

In a first advantageous embodiment, the auxiliary camera is arranged to measure the plurality of sets of markers and the orientation of at least one of the support structure and the first camera, when the wind turbine blade is arranged in a substantially zero-load condition. The substantially zero-load condition (or low load condition) may for instance be obtained when the wind turbine blade is oriented in a vertical position hanging down or pointing up. By arranging the auxiliary camera so that it can measure the sets of markers and the orientation of the camera or support structure in the substantially zero-load condition, it is ensured that the measurements carried out by the auxiliary camera can be carried out when the loads are minimised and the induced torsion of the wind turbine blade is low and known. This will improve the accuracy of the calibration. Further, the orientation of the first camera relative to the blade can frequently be monitored or verified, at least during standstills of the wind turbine, so that the system can be frequently calibrated or verified.

In another advantageous embodiment, the support structure, and optionally the first camera, is provided with auxiliary reference markers, and wherein the auxiliary camera is arranged to measure the auxiliary reference markers so as to determine the position of at least the first camera. It is recognised that the camera is relatively small, and that it may be difficult to accurately measure the orientation of the first camera itself. However, the first camera has a fixed position relative to the support structure. Thus, by being able to measure the orientation of the support structure, it is possible to use this measure to calibrate the measurements or pictures taken by the first camera. The support structure advantageously comprises at least two auxiliary reference markers so as to determine the orientation of the support structure relative to a known orientation or the exterior surface of the blade.

In yet another advantageous embodiment, the plurality of sets of markers and the first camera are provided on a downwind side (or equivalently the leeward side or suction side) of the wind turbine blade. This is particularly advantageous during operation, because the wind turbine blades will deflect towards the leeward side of the rotor. However, it is contemplated that the plurality of sets of markers and the first camera may be provided on an upwind side (or equivalently a windward side or pressure side) of the wind turbine blade.

In another embodiment, at least a number of the plurality of sets of markers each comprise at least a plurality of markers having a first colour, and a plurality of markers of a second colour, which is different from the first colour. It is for instance possible to use two, three or four colours. The colours may for instance be equivalent to RGB or CMYK. This makes the system more robust, because the measurements can be carried out for each of the colours, e.g. via separate channels or filters of the measurements carried out by the first camera, to verify the measured torsion and ensuring that other objects of a similar colour to some of the markers do not cause erroneous calculations of the torsion, which in turn could lead to an incorrect control of the wind turbine respectively validation data.

In one embodiment, the plurality of set of markers comprises a first set of reference markers near the root section. This set of markers can thus be positioned at a spanwise position that will have relatively low induced torsion, and which in individual measurements of the first camera can be used as a reference to calculate induced torsion at the spanwise positions in the wind turbine blade. The reference markers may thus be positioned in an area which will experience relatively low torsion and can be used as a reference to determine torsion of the wind turbine blade further outboard on the wind turbine blade, but also to detect shifts or deflections of the first camera or the support structure.

Preferably, the system is configured to calculate the torsion angle of the wind turbine blade at different spanwise positions by measuring the mutual positions of individual marker points of the plurality of sets of markers. The torsion angle may for instance be calculated by comparing measurements of the individual marker points of the plurality of sets of markers with measurements of the reference markers near the root section (or marker sets with respect to each other).

In a first embodiment of the method, the method comprises the step of measuring the orientation of at least one of the support structure and the first camera to calibrate the wind turbine blade measurement system. As indicated above, the measured orientation can be utilised to correct the measurements or pictures taken by the first camera. Further, with this calibration, it is possible to determine torsion and absolute twist angles under operational conditions, even if the markers are not all visible in the zero-load condition.

In another embodiment, the method further comprises the steps of pre-calibrating the wind turbine blade measurement system by the following steps: i) measuring the orientation of at least one of the support structure and the first camera relative to a known reference direction, e.g. a vertical direction, using the auxiliary camera, ii) carrying out a first pre-calibration measurement of at least a number of the plurality of sets of markers using the first camera, and iii) determining a rotation angle offset between measured orientation and the known reference direction. The known reference may for instance be the exterior surface of the blade. However, the known orientation may also be a temporary reference, such as a vertical reference direction. The reference may for instance be provided by a laser tool or a plumb bob. Thus, the system can be pre-calibrated, which can be used to calibrate the measurements or pictures taken with the first camera.

In yet another embodiment, the wind turbine blade measurement system subsequently during operation of the wind turbine is carrying out the steps of: d) carrying out an operational measurement of the plurality of sets of markers, and e) calculating an induced torsion angle for each of the different spanwise positions of the blade by calculating the angle between individual marker points of each of the plurality of sets of markers and f) comparing them to the zero-load twist angles. It is recognised that these steps are steps that are carried out during normal operation of the wind turbine to be able to continuously monitor the torsion of the blade, and if need be control the wind turbine or wind turbine blade (e.g. by pitching the wind turbine blade) to control e.g. loads or oscillations. The induced torsion angle can be calculated by measuring the angles between the marker points in a set of markers and comparing them to the corresponding angles measured, e.g. with the second camera, at the substantially zero-load condition.

In a further embodiment, the method comprises the additional step of g) calculating an absolute twist angle for each of the different spanwise positions of the blade by use of the rotation angle offset and the pictures of the second camera at the substantially zero-load condition. The absolute twist angle can be calculated by adding the measured twist at the substantial zero-load condition, obtained accounting for the camera rotation angle offset, and adding the calculated induced torsion.

As mentioned above, the orientation of the support structure is advantageously measured by use of reference markers on the support structure.

In the above, it has been emphasized that the system and method is configured to measure the torsion of the blade. However, it is recognized that the system and method can also be used to monitor edgewise and flapwise deflections, e.g. by observing translation of the measured sets of markers in the measurements carried out by the first camera.

BRIEF DESCRIPTION OF THE FIGURES

The invention is explained in detail below with reference to embodiments shown in the drawings, in which.

DETAILED DESCRIPTION OF THE INVENTION

In the following, a number of exemplary embodiments are described in order to understand the invention.

Figure 1:
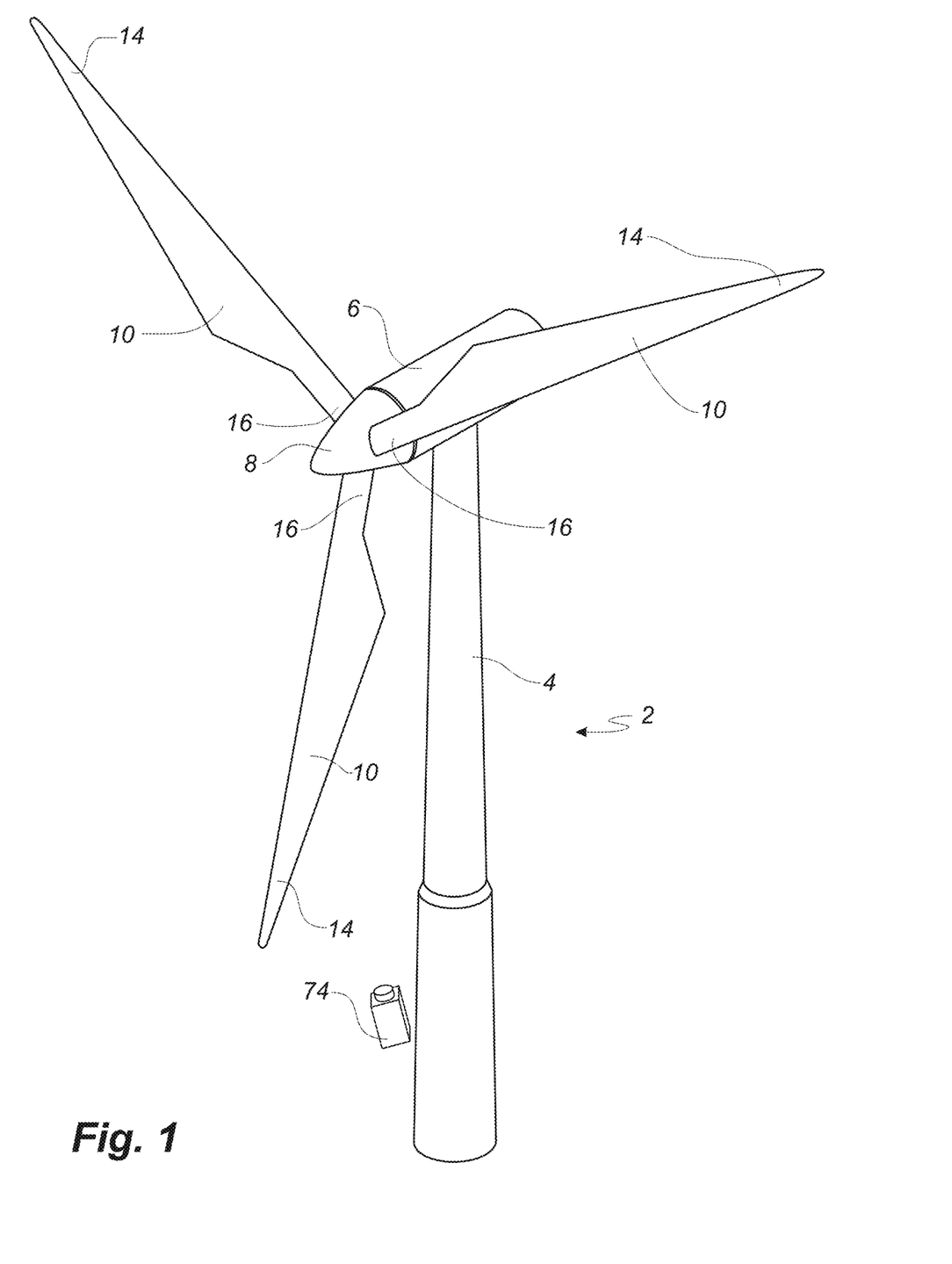
FIG. 1 shows a wind turbine.

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

Figure 2:
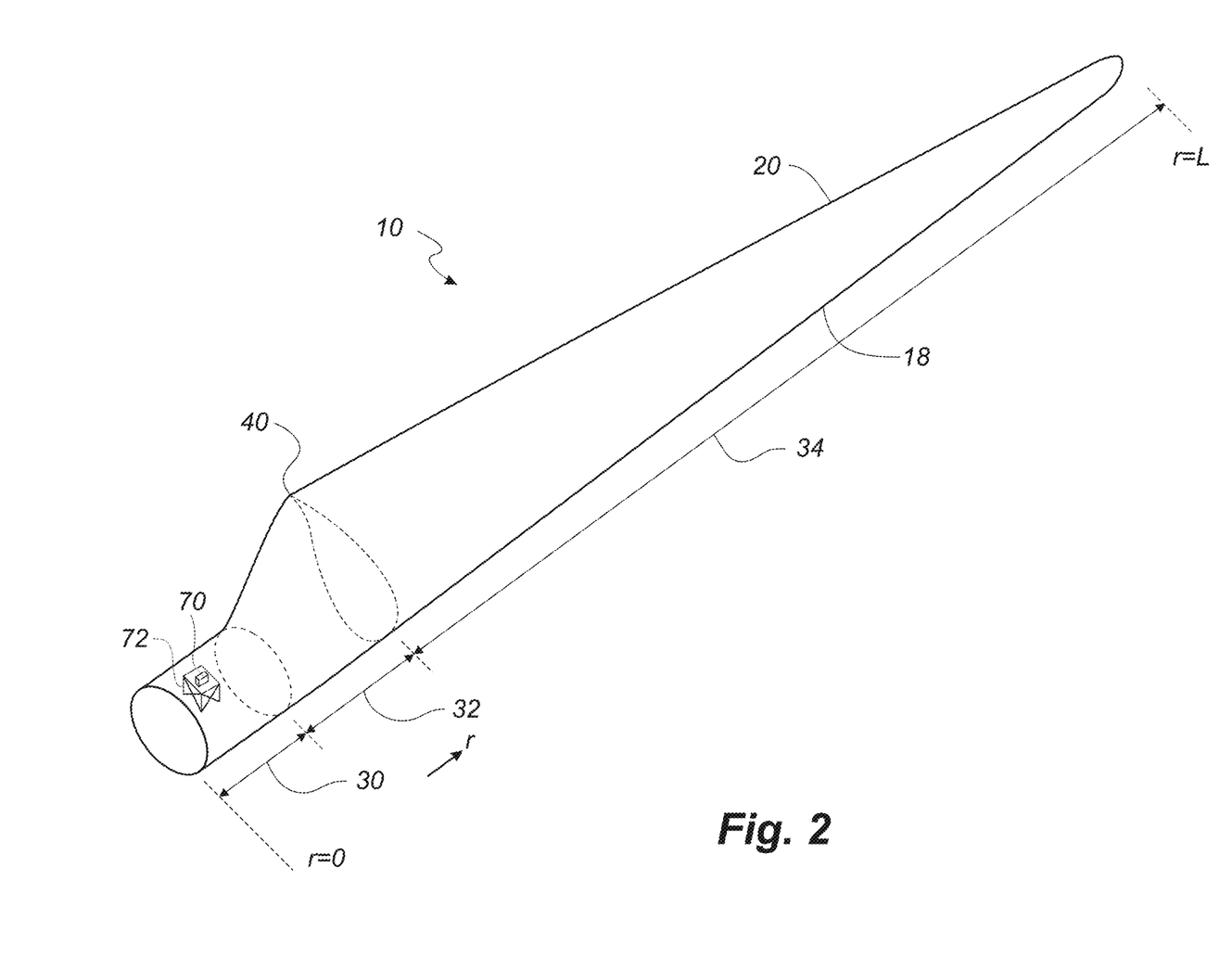
FIG. 2 shows a schematic view of a wind turbine blade.

FIG. 2 shows a schematic view of a first embodiment of a wind turbine blade 10. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance rfrom the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

Figures 3, 4:
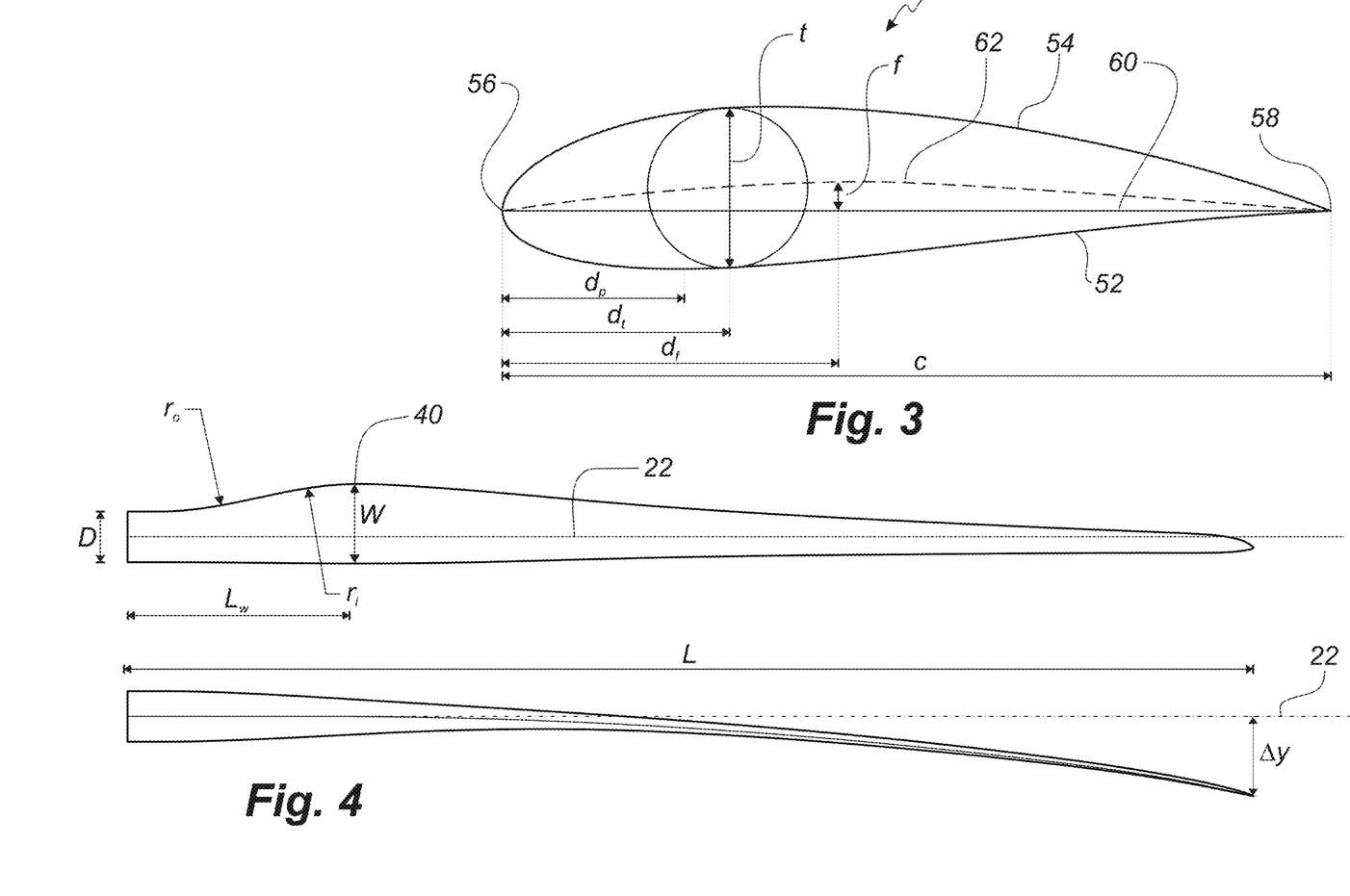
FIG. 3 shows a schematic view of an airfoil profile.
FIG. 4 shows a schematic view of the wind turbine blade, seen from above and from the side.

FIGS. 3 and 4 depict parameters, which is used to explain the geometry of wind turbine blades.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

FIG. 4 shows other geometric parameters of the blade. The blade has a total blade length L. As shown in FIG. 3, the root end is located at position r=0, and the tip end located at r=L. The shoulder 40 of the blade is located at a position r=$L_w$, and has a shoulder width W, which equals the chord length at the shoulder 40. The diameter of the root is defined as D. The curvature of the trailing edge of the blade in the transition region may be defined by two parameters, viz. a minimum outer curvature radius $r_o$ and a minimum inner curvature radius $r_i$ which are defined as the minimum curvature radius of the trailing edge, seen from the outside (or behind the trailing edge), and the minimum curvature radius, seen from the inside (or in front of the trailing edge), respectively. Further, the blade is provided with a prebend, which is defined as Δy, which corresponds to the out of plane deflection from a pitch axis 22 of the blade.

FIGS. 1 and 2 further show additional parts of a wind turbine blade measurement system for optically determining a torsion of a wind turbine blade. The wind turbine blade 10 is provided with a plurality of sets of markers (not disclosed in FIGS. 1 and 2) on an exterior surface of the wind turbine blade 10 at different spanwise positions on the wind turbine blade along a spanwise direction of the wind turbine blade, each set of markers comprising a plurality of individual marker points. The wind turbine blade measurement system further comprises a first camera 70, which is mounted in a fixed position on a support structure on an exterior surface of the root section 30 of the wind turbine blade 10. The first camera 70 is arranged and oriented so as to measure along the spanwise direction of the blade, so that the plurality of sets of marker points can be detected with the camera 70. The wind turbine blade measurement system further comprises an auxiliary camera 74, which is arranged at a position relative to the wind turbine 2. The auxiliary camera 74 is arranged so as to being able to carry out measurements of the plurality of sets of markers and an orientation of at least one of the support structure and the first camera 70. As seen from FIG. 2, the first camera may advantageously be arranged on the suction side of the wind turbine blade. In such a configuration, the first camera can better measure the torsion of the wind turbine blade 10 during operation of the wind turbine 2, where the wind turbine blades 10 will deflect towards the tower 4.

Figure 5:
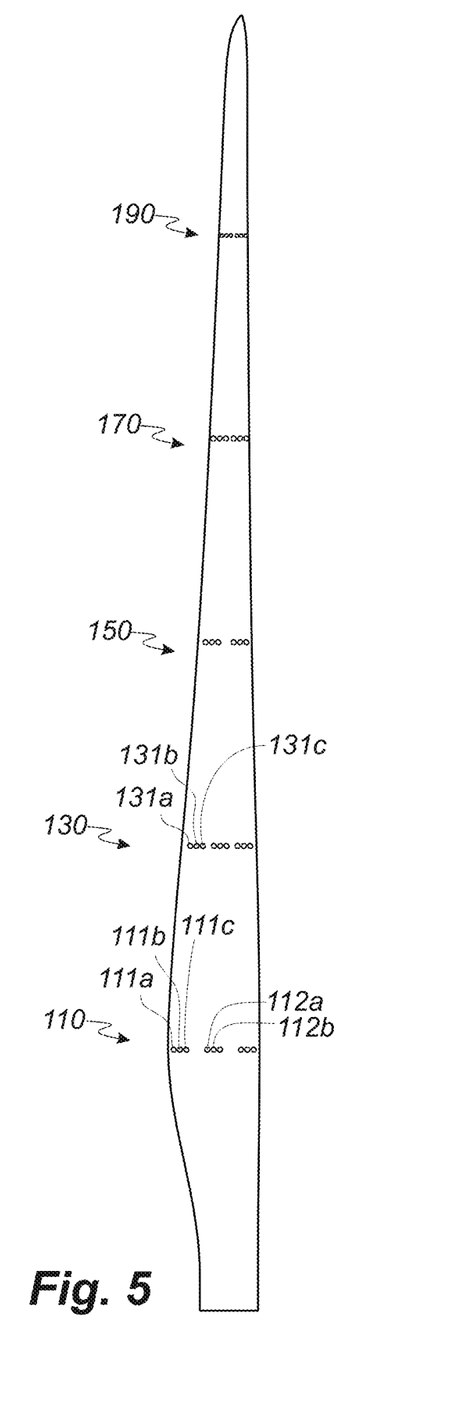
FIG. 5 shows a first example of a plurality of sets of markers on a wind turbine blade.
Figure 6:
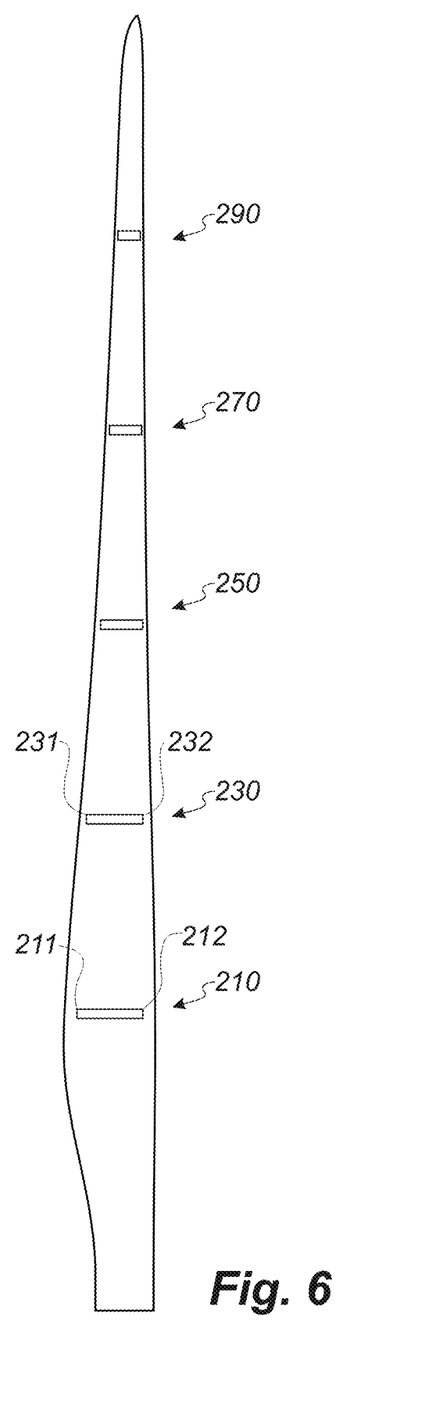
FIG. 6 shows a second example of a plurality of sets of markers on a wind turbine blade.

FIGS. 5 and 6 disclose a first and second example of markers that are applicable to determine the local torsion of the blade.

FIG. 5 shows a first example of a blade, which has a plurality of sets of markers 110, 130, 150, 170, 190 at different spanwise positions on the wind turbine blade. As mentioned in relation to the embodiment shown in FIG. 2, the plurality of sets of markers 110, 130, 150, 170, 190 are advantageously arranged on the suction side of the wind turbine blade. Each of the set of markers comprise a plurality of individual marker points. A first set of markers 110 for instance comprises a plurality of marker points 111, 112 and so forth, and a second set of markers 130 comprises marker points 131 and so forth. Each of the individual marker points may further include marker points of different colours. This is illustrated in FIG. 5 with individual markers 111a, 112a, 131a, which may have a first colour, individual markers 111b, 112b, 131b having a second colour, and individual markers 111c, 131c having a third colour. The individual markers may for instance have two, three or four different colours. The colours may for instance be equivalent to RGB or CMYK. This makes the system more robust, because the measurements can be carried out for each of the colours, e.g. via separate channels or filters of the measurements carried out by the first camera, to verify the measured torsion and ensuring that other objects of a similar colour to some of the markers do not cause erroneous calculations of the torsion, which in turn could lead to an incorrect control of the wind turbine.

FIG. 6 shows a second example of a blade, which has a plurality of sets of markers 210, 230, 250, 270, 290 at different spanwise positions on the wind turbine blade. The plurality of sets of markers 210, 230, 250, 270, 290 are advantageously arranged on the suction side of the wind turbine blade. In this embodiment, the sets of markers 210, 230, 250, 270, 290 are provided as rectangular markers on the surface of the blade. Each of the set of markers 210, 230, 250, 270, 290 comprise a plurality of individual marker points 211, 212, 231, 232. As illustrated in FIG. 6, the individual marker points 211, 212, 231, 232 can for instance be constituted of the corners of the rectangular markers.

Figure 7:
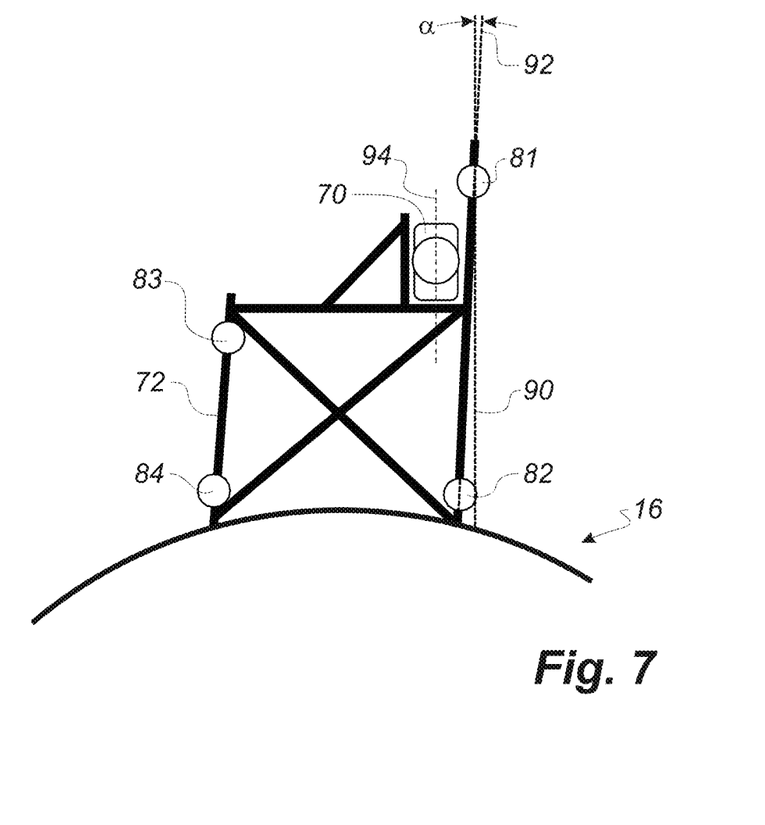
FIG. 7 shows a schematic view of a first camera mounted on a support structure on the exterior surface of a wind turbine blade.

FIG. 7 illustrates a setup for mounting the first camera 70 to the exterior surface of a wind turbine blade at the blade root 16 in the root section 30. The first camera 70 is mounted on the support structure 72. The support structure 72, and optionally the first camera 70, is provided with auxiliary reference markers 81, 82, 83, 84. The first camera has a first camera axis or image axis 94, which at the time of instalment is not accurately determined. It is recognised that the camera is relatively small, and that it may be difficult to accurately measure the orientation of the first camera itself. However, the first camera has a fixed position relative to the support structure. Thus, by being able to measure the orientation of the support structure, it is possible to use this measure to calibrate the measurements or pictures taken by the first camera. As an example, two of the reference markers 81, 82 are arranged along a reference marker line 92. In a calibration step, the orientation of the reference marker line 92 can be determined in relation to a known reference direction 90, such as vertical, which for instance can be established via a laser tool or a plumb bob. The reference maker line 92 and the known reference direction can be utilised to measure a rotation angle offset between at least a number of the plurality of sets of markers measured and the known reference angle, preferably using the auxiliary camera 74.

Figure 8:
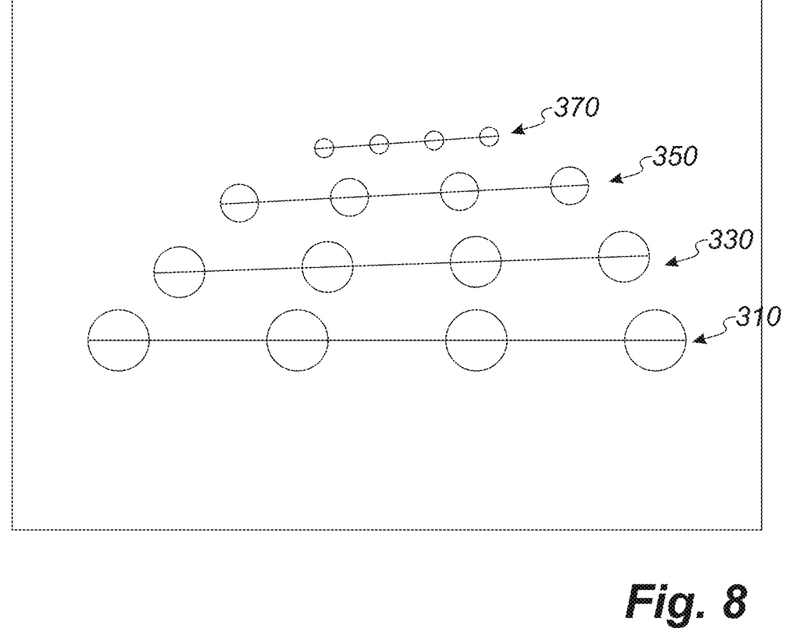
FIG. 8 illustrates an example of measured markers on a wind turbine blade.
Figure 9:
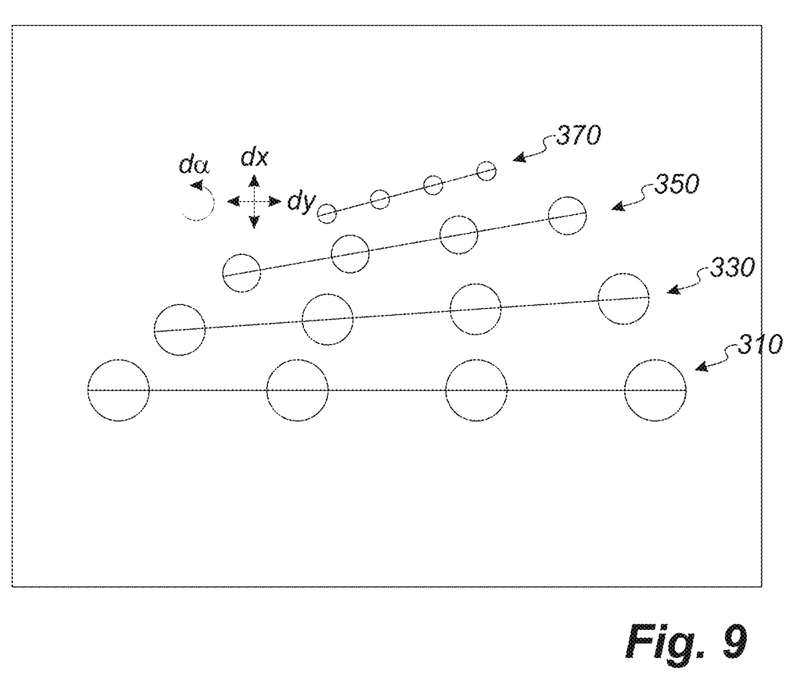
FIG. 9 illustrates another example of measured markers on a wind turbine blade.
Figure 10:
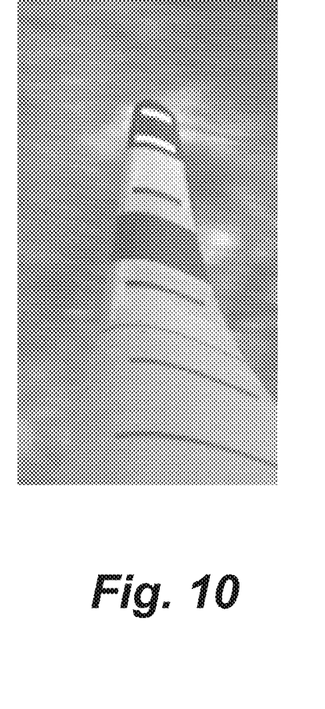
FIG. 10 illustrates an image obtained by a first camera during operation of a wind turbine.

FIGS. 8 and 9 illustrate two examples of images of markers on the wind turbine blade measured by the first camera 70 during two different operational conditions. The images are shown as filtered or image processed images showing the markers only and not the wind turbine blade itself. However, it is clear that the images sampled by the first will show the wind turbine blade and other objects, e.g. as the image shown in FIG. 10.

FIGS. 8 and 9 show a first set of markers 310, a second set of markers 330, a third set of markers 350, and a fourth set of markers 370. Each of the set of markers 310, 330, 350, 370 comprise a plurality of individual marker points. In the given example, each of the set of markers 310, 330, 350, 370 comprise four individual marker points. However, it is recognized that two individual marker points are sufficient in order to derive an angle between the individual marker points and use that to calculate a local torsion of the blade. However, by using additional marker points, the measurements can be made more accurate, e.g. by better distinguishing between torsion and for instance a local bulging of the wind turbine blade shell.

In the first image shown in FIG. 8, the individual marker points each form an angle relative to the image axes. This angle can be used to calculate the local torsion. In the second image, shown in FIG. 9, it is seen that the individual marker points have moved and now form new angles relative to the image axes. The difference between corresponding angles in the two images can be utilised to calculate a local induced torsion of the wind turbine blade, i.e. the difference in torsion angles between the two obtained images. If the image of FIG. 8 is a reference image with known absolute twist angles, it is recognised that the absolute twist angles can also be calculated for the second image in FIG. 9. If the first camera cannot detect all of plurality of sets of markers in the zero-load condition, the information can be obtained by measurements from the auxiliary camera.

In the given example, the marker points are aligned along a straight line. However, it is recognised that the markers will generally be aligned along a curve corresponding to the curvature of the wind turbine blade. The induced torsion can in general be calculated by calculating the rotational angle of said curve between images. Image processing techniques to calculate the rotational angle between two images are known in the art, e.g. by cross-correlating images.

Further, it is clear that the induced edgewise and flapwise deflections can also be calculated by observing translation of said curve along the image axes. This can also be carried out by image processing techniques known in the art, e.g. by cross-correlating images. Overall, image translations dx and dy as well as image roll da can be used to calculate the local deflection and torsion of the wind turbine blade.

The first set of markers 310 may be arranged relatively close to the first camera near the root section 30. This set of markers 310 can thus be positioned at a spanwise position that will have relatively low induced torsion and deflection, and which in individual measurements of the first camera can be used as a reference to calculate induced torsion at the spanwise positions in the wind turbine blade or to track changes to the orientation of the first camera.

The auxiliary camera 74 may also obtain an image of the markers on the wind turbine blade as well as the orientation of the first auxiliary blade, which can be used to calibrate the system and obtain absolute twist measurements at known conditions for the wind turbine blade, e.g. by obtaining a reference measurement, when the blade is arranged in a substantially zero-load condition.

From the above, it is clear that the system in general uses a first camera, which is mounted on the blade and during operation rotates with the wind turbine blade on the blade rotor. The first camera is oriented in the spanwise direction so as to be able to detect the plurality of sets of markers. The system may have a computing or processing unit that at least can calculate the induced or relative twist or torsion of the blade at the spanwise positions of the blade by detecting the position of the markers, i.e. by taking pictures along the spanwise direction of the blade and use image processing to calculate the local torsion.

Thus, the first camera 70 may be utilised to calculate the relative or induced torsion of the wind turbine blade 10 during operation of the blade. However, due to curvature of the wind turbine blade 10, the first camera 70 may not necessarily be able to detect all of the sets of markers during standstill or low or very high wind speeds of the wind turbine blade. Thus, the first camera 70 may not be accurate enough to calibrate the system during standstill of the wind turbine blade 10 or not suited for calibrating the system in these conditions because the markers may not all be visible. The system solves this problem by utilising an auxiliary camera 74, which is mounted at a stationary or arranged at a suitable position outside the wind turbine blade 10, e.g. at a fixed position relative to the wind turbine 2, such as on the ground near the wind turbine. The auxiliary camera 74 is arranged so as to be able to carry out measurements of the plurality of sets of markers and an orientation of at least one of the support structure and the first camera 70. Thus, the auxiliary camera 74 may at least during standstill of the wind turbine carry out measurements of the plurality of sets of markers and use this to calibrate the system by comparing the measurements carried out by the auxiliary camera 74 to equivalent measurements from the first camera 70. Further, when the markers become visible to the first camera 70, the torsion and absolute twist angles may be reconstructed using the information obtained by the auxiliary camera.

In the following, a method according to the present disclosure is described. The method comprises the steps shown in FIG. 11.

Figure 11:
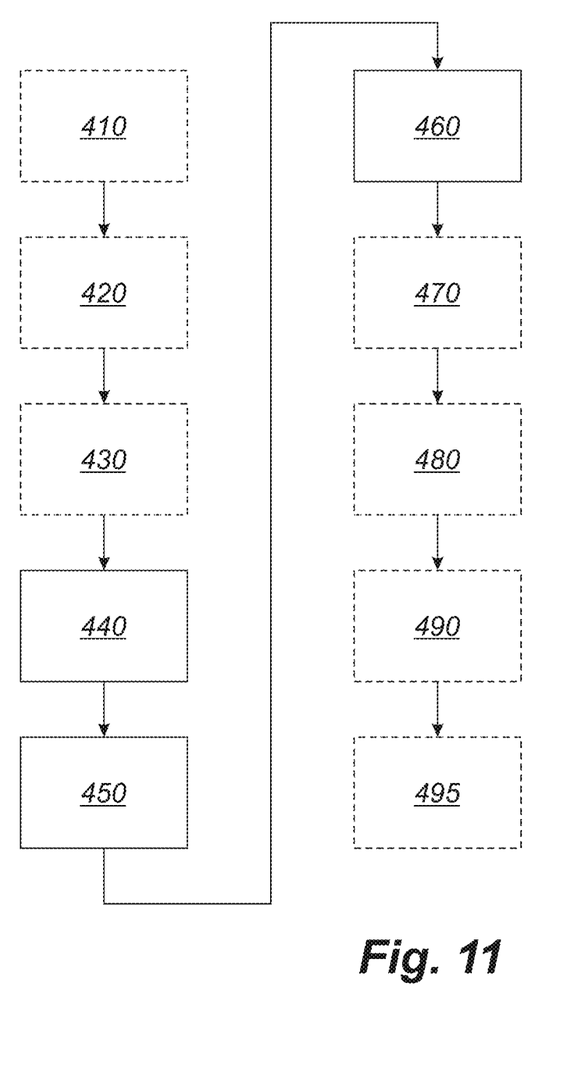
FIG. 11 is a flow chart illustrating the steps involved in a method of the present disclosure.

If a first step 410, as part of the steps for pre-calibration of the wind turbine blade measurement system, the orientation of at least one of the support structures 72 and the first camera 70 relative to the known reference direction 90, e.g. a vertical direction, is measured using the auxiliary camera 74. The wind turbine blade may before the first step be brought into a known position, such as a substantially zero-load condition.

In a second step 420, a first pre-calibration measurement of at least a number of the plurality of sets of markers using the first camera 70 is carried out.

In a third step 430, a rotation angle offset a between at least a number of the plurality of sets of markers measured and the known reference angle. The known reference may for instance be set by the exterior surface of the wind turbine blade. However, the known orientation may also be a temporary reference, such as a vertical reference direction as shown in FIG. 7. The reference may for instance be provided by a laser tool or a plumb bob. Thus, the system can be pre-calibrated, which can be used to calibrate the measurements or pictures taken with the first camera.

In a fourth step 440, the wind turbine blade 10 is arranged in a substantially zero-load condition.

In a fifth step 450, a reference measurement of the plurality of sets of markers is carried out and zero-load twist angles are calculated for each of the spanwise positions on the wind turbine blade by use of at least the auxiliary camera.

In a sixth step 460, a first measurement of at least a number of the plurality of sets of markers is carried out using the first camera 70, and the first measurement is compared with the reference measurement to calibrate the wind turbine blade measurement system.

The images taken by the first camera 70 and the auxiliary camera 74 may for instance be correlated to calculate the zero-load twist angles.

In a seventh optional step 470, the orientation of at least one of the support structure and the first camera may be measured to calibrate the wind turbine blade measurement system.

In an eighth step 480, carried out during subsequent operation of the wind turbine 2, an operational measurement of the plurality of sets of markers is carried out using the first camera 70.

In a ninth step 490, an induced torsion angle for each of the different spanwise positions of the blade by calculating the angle between individual marker points of each of the plurality of sets of markers is calculated and compared to the zero-load twist angles.

It is recognised that steps 470-490 are carried out during normal operation of the wind turbine to be able to continuously monitor the torsion of the blade, and if need be control the wind turbine or wind turbine blade (e.g. by pitching the wind turbine blade) to control e.g. loads or oscillations. The induced torsion angle can be calculated by measuring the angles between the marker points in a set of markers and comparing them to the corresponding angles measured at the substantially zero-load condition.

In a tenth step 495, an absolute twist angle for each of the different spanwise positions of the blade is calculated by use of the rotation angle offset. The absolute twist angle can be calculated by adding the measured twist at the substantial zero-load condition and adding the calculated induced torsion, and further by using the measured rotation angle offset.

| List of Reference Numerals | |
|---|---|
| 2 | wind turbine |
| 4 | tower |
| 6 | nacelle |
| 8 | hub |
| 10 | wind turbine blade |
| 14 | blade tip |
| 16 | blade root |
| 18 | leading edge |
| 20 | trailing edge |
| 22 | pitch axis |
| 30 | root region |
| 32 | transition region |
| 34 | airfoil region |
| 40 | shoulder |
| 50 | airfoil profile |
| 52 | pressure side |
| 54 | suction side |
| 56 | leading edge |
| 58 | trailing edge |
| 60 | chord |
| 62 | camber line |
| 70 | first camera |
| 72 | support structure |
| 74 | auxiliary camera |
| 81, 82, 83, 84 | reference markers |
| 90 | known reference direction |
| 92 | reference marker line |
| 94 | image/camera axis |
| 110, 130, 150, 170, 190, 210, 230, 250, 270, 290, 310, 330, 350, 370 | sets of markers |
| 111a, 111b, 111c, 112a, 112b, 112c, 113a..., 131a, 131b, 131c,..., 211, 212, 231, 233,..., 311, 312,... | marker points |
| α | rotation angle offset |
| c | chord length |
| D | diameter of the root |
| $d_t$ | position of maximum thickness |
| $d_f$ | position of maximum camber |
| $d_p$ | position of maximum pressure side camber |
| f | camber |
| L | blade length |
| r | local radius, radial distance from blade root |
| t | thickness |
| Δy | prebend |
| W | shoulder width |

The invention claimed is:

1. A wind turbine blade measurement system for optically determining a torsion of a wind turbine blade, wherein the wind turbine blade measurement system comprises: a wind turbine blade, which is configured to be mounted to a hub of a wind turbine, the wind turbine blade comprising: a root section, which when mounted to the hub, is located nearest the hub, and a plurality of sets of markers provided on an exterior surface of the wind turbine blade at different spanwise positions on the wind turbine blade along a spanwise direction of the wind turbine blade, each set of markers comprising a plurality of individual marker points, a first camera, which is mounted in a fixed position on a support structure on an exterior surface of the root section of the wind turbine blade, and arranged so as to measure along the spanwise direction of the wind turbine blade, and an auxiliary camera, which is arranged at a position outside of the wind turbine blade, the auxiliary camera being arranged so as to being able to carry out measurements of the plurality of sets of markers and an orientation of at least one of the support structure and the first camera; wherein the support structure is provided with auxiliary reference markers, and wherein the auxiliary camera is arranged to measure the auxiliary reference markers so as to determine the position and/or alignment of at least the first camera.

2. The wind turbine blade measurement system according to claim 1, wherein the auxiliary camera is arranged to measure the plurality of sets of markers and the orientation of at least one of the support structure and the first camera, when the wind turbine blade is arranged in a substantially zero-load condition.

3. The wind turbine blade measurement system according to claim 1, wherein the support structure comprises at least two auxiliary reference markers so as to determine the orientation of the support structure relative to a known orientation or the exterior surface of the blade.

4. The wind turbine blade measurement system according to claim 1, wherein the plurality of sets of markers and the first camera are provided on a downwind side of the wind turbine blade.

5. The wind turbine blade measurement system according to claim 1, wherein at least a number of the plurality of sets of markers each comprise at least a plurality of markers having a first colour, and a plurality of markers of a second colour, which is different from the first colour.

6. The wind turbine blade measurement system according to claim 1, wherein the plurality of set of markers comprises a first set of reference markers near the root section.

7. The wind turbine blade measurement system according to claim 1, wherein the system is configured to calculate the torsion angle of the wind turbine blade at different spanwise positions by measuring the mutual positions of individual marker points of the plurality of sets of markers.

8. The wind turbine blade measurement system according to claim 6, wherein the torsion angle is calculated by comparing measurements of the individual marker points of the plurality of sets of markers with measurements of the reference markers near the root section.

9. A wind turbine blade measurement system for optically determining a torsion of a wind turbine blade installed on a wind turbine, wherein the wind turbine blade measurement system comprises: a wind turbine with a number of wind turbine blades, including at least a first wind turbine blade, extending from a hub on a main shaft having a substantially horizontal axis, the number of wind turbine blades together with the hub constituting a rotor, which can be put into rotation by wind, wherein the first wind turbine blade comprises: a root section located nearest the hub, and a plurality of sets of markers provided on an exterior surface of the first wind turbine blade at different spanwise positions on the first wind turbine blade along a spanwise direction of the wind turbine blade, each set of markers comprising a plurality of individual marker points, a first camera, which is mounted in a fixed position on a support structure on an exterior surface of the root section of the wind turbine blade, and arranged so as to measure along the spanwise direction of the first wind turbine blade, and an auxiliary camera, which is arranged at a position relative to the wind turbine, the auxiliary camera being arranged so as to being able to carry out measurements of the plurality of sets of markers and an orientation of at least one of the support structure and the first camera; wherein the support structure is provided with auxiliary reference markers, and wherein the auxiliary camera is arranged to measure the auxiliary reference markers so as to determine the position and/or alignment of at least the first camera.

10. A method of improving accuracy of a wind turbine blade measurement system, wherein the wind turbine blade measurement system comprises: a wind turbine blade, which is configured to be mounted to a hub of a wind turbine, the wind turbine blade comprising: a root section, which when mounted to the hub, is located nearest the hub, and a plurality of sets of markers provided on an exterior surface of the wind turbine blade at different spanwise positions on the wind turbine blade along a spanwise direction of the wind turbine blade, each set of markers comprising a plurality of individual marker points, a first camera, which is mounted in a fixed position on a support structure on an exterior surface of the root section of the wind turbine blade, and arranged so as to measure along the spanwise direction of the wind turbine blade, and an auxiliary camera, which is arranged at a position outside of the wind turbine blade, the auxiliary camera being arranged so as to being able to carry out measurements of the plurality of sets of markers and an orientation of at least one of the support structure and the first camera, wherein the method comprises the steps of:
a) arranging the wind turbine blade in a substantially zero-load condition,
b) carrying out a reference measurement of the plurality of sets of markers and calculate zero-load twist angles for each of the spanwise positions on the wind turbine blade using the auxiliary camera, and
c) carrying out a first measurement of at least a number of the plurality of sets of markers using the first camera and comparing the first measurement with the reference measurement to calibrate the wind turbine blade measurement system;
providing the support structure with auxiliary reference markers, arranging the auxiliary camera to measure the auxiliary reference markers and determining the position and/or alignment of at least the first camera.

11. The method according to claim 10, wherein the method further comprises the step of measuring the orientation of at least one of the support structure and the first camera to calibrate the wind turbine blade measurement system.

12. The method according to claim 10, wherein the method further comprises the steps of pre-calibrating the wind turbine blade measurement system by the following steps:
i) measuring the orientation of at least one of the support structure and the first camera relative to a known reference direction, e.g. a vertical direction, using the auxiliary camera,
ii) carrying out a first pre-calibration measurement of at least a number of the plurality of sets of markers using the first camera, and
iii) determining a rotation angle offset between measured orientation and the known reference direction.

13. The method according to claim 10, wherein the wind turbine blade measurement system subsequently during operation of the wind turbine carrying out the steps of:
d) carrying out an operational measurement of the plurality of sets of markers, and
e) calculating an induced torsion angle for each of the different spanwise positions of the blade by calculating the angle between individual marker points of each of the plurality of sets of markers, and
f) comparing them to the zero-load twist angles.

14. The method according to claim 12, wherein the method comprises the additional step of:
g) calculating an absolute twist angle for each of the different spanwise positions of the blade by use of the rotation angle offset.

15. The method according to claim 10, wherein the orientation of the support structure is measured by use of reference markers on the support structure.

\* \* \* \* \*